United States Patent [19]

Newstead et al.

[11] 3,896,706
[45] July 29, 1975

[54] BRAKE ACTUATOR UNITS

[75] Inventors: Charles Newstead; Andrew Charles Wright, both of Birmingham, England

[73] Assignee: Girling Limited, Birmingham, England

[22] Filed: Feb. 26, 1973

[21] Appl. No.: 335,897

[30] Foreign Application Priority Data
Mar. 1, 1972 United Kingdom.................. 9538/72
May 31, 1972 United Kingdom............... 25404/72

[52] U.S. Cl. ......................... 92/63; 92/108; 92/130; 92/129
[51] Int. Cl.............................. F01b 7/00
[58] Field of Search ............ 92/61, 62, 63, 64, 107, 92/108, 65, 130, 129

[56] References Cited
UNITED STATES PATENTS

| | | | |
|---|---|---|---|
| 2,980,066 | 4/1961 | Stelzer et al...................... | 92/107 X |
| 3,188,922 | 6/1965 | Cruse................................. | 92/63 X |
| 3,312,313 | 4/1967 | Moyer.............................. | 92/61 X |
| 3,401,606 | 9/1968 | Mathews et al..................... | 92/63 X |
| 3,403,602 | 10/1968 | Brandon, Jr. ........................... | 92/61 |
| 3,462,986 | 8/1969 | Cox, Jr. et al. ......................... | 92/63 |
| 3,485,537 | 12/1969 | Schlor et al........................ | 92/63 X |
| 3,731,596 | 5/1973 | Burgdorf............................. | 92/61 X |

FOREIGN PATENTS OR APPLICATIONS
163,735    8/1933    Switzerland............................ 92/63

*Primary Examiner*—Martin P. Schwadron
*Assistant Examiner*—Abraham Hershkovitz
*Attorney, Agent, or Firm*—Scrivener Parker Scrivener and Clarke

[57] ABSTRACT

An actuator unit for a vehicle wheel brake comprises a fixed cylinder body defining a first cylinder, a piston working in the first cylinder for service brake operation, and a fluid pressure motor for emergency braking or parking. The motor comprises a piston working in a second cylinder and spring biassed towards a brake-applying position, and a fluid pressure chamber which is normally pressurized to hold the motor piston in a brakereleasing position, the motor piston being mounted on and guided at its inner periphery over the fixed cylinder body.

3 Claims, 6 Drawing Figures

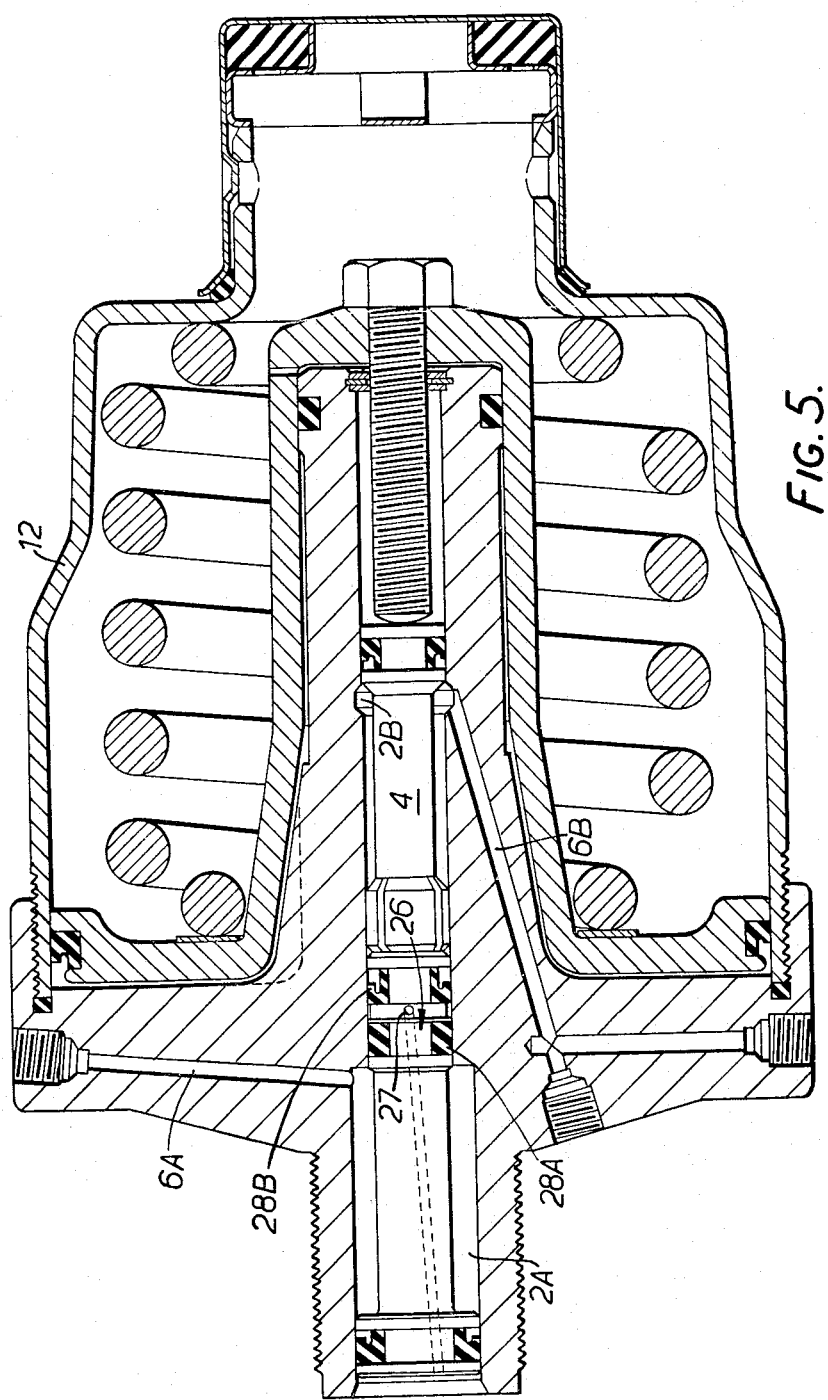

3,896,706

BRAKE ACTUATOR UNITS

This invention relates to vehicle wheel brake actuating units. Brake actuating units are known which comprise cylinder and piston or diaphragm means for service braking, for example an hydraulic cylinder and piston, and a pressure retractable spring motor for emergency braking and/or parking, for example a pneumatically operable motor.

Brake actuating units of this general form have tended to be unduly bulky, making it difficult in many cases to find sufficient room for their installation.

It is accordingly an object of the present invention to provide a brake actuator unit which is relatively compact.

Accordingly, the invention provides an actuator unit for vehicle wheel brake, comprising a fluid pressure operable member working in a first cylinder of a fixed cylinder body for service brake operation, and a fluid pressure motor for emergency braking or parking, the motor having a piston working in a second cylinder and biassed towards a brake-applying position by spring means, and a fluid pressure chamber which is normally pressurized to hold the piston in a brake releasing position, wherein the motor piston is mounted on and guided at its inner periphery over the fixed cylinder body.

Three forms of actuator unit in accordance with the invention are described below, by way of example, with reference to the accompanying drawings, in which:-

FIGS. 4 and 5 are views corresponding to FIGS. 1 and 2 of a third form of unit.

Figure 1:
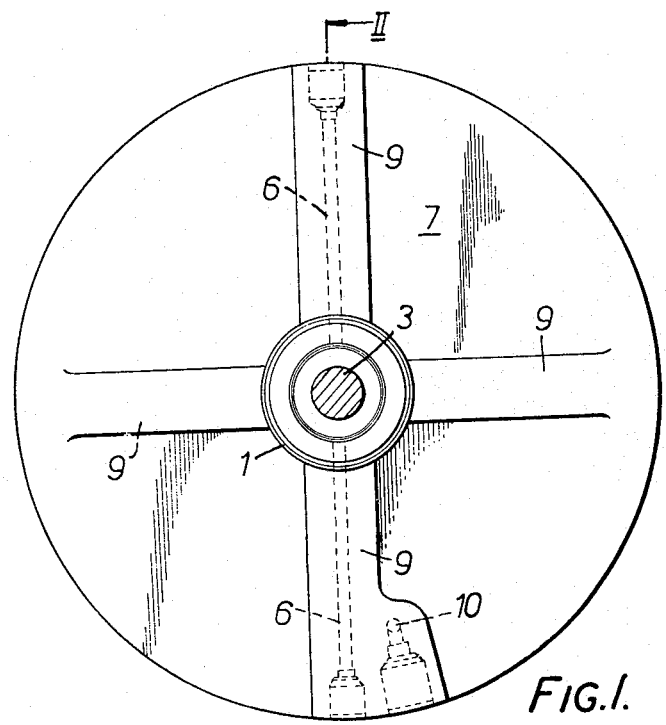
FIG. 1 is an end view of one form of unit.

Each of the four brake actuator units shown in the drawings comprises an hydraulic cylinder and piston motor, the rear (right hand) part of which is concentrically surrounded by a pneumatic pressure retractable spring motor.

Figure 2:
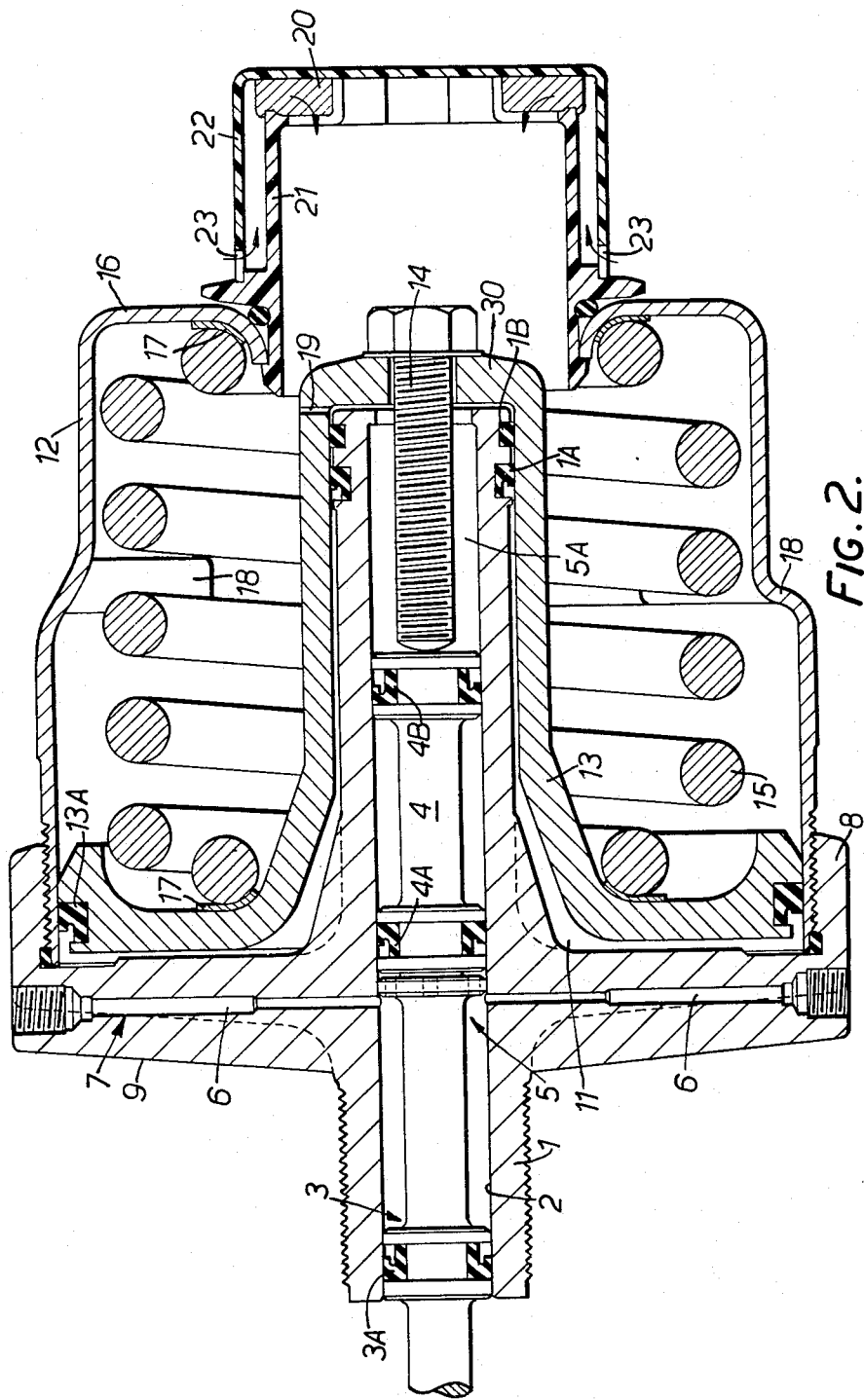
FIG. 2 is a section on the line II-II of FIG. 1.

The unit shown in FIGS. 1 and 2 is shown in its fully actuated position. The hydraulic motor comprises a cylinder body 1 having a through bore 2 housing two separate pistons 3 and 4, carrying sliding pressure seals 3A and 4A and sliding seal 4B which is preferably a wiper seal, respectively. The wiper seal 4B is interposed between the non-working space 5A of the cylinder bore 2 and the pressure seal 4A so that the surface of bore 2 exposed to air is wiped before it is contacted by seal 4A. The forward end of the forward piston 3 projects from the cylinder bore 2 for connection to an actuating rod (not shown) for actuating a wheel brake or brakes, for example of the wedge actuated type. The pressure space 5 of the cylinder bore has inlet and bleed ports 6.

The body 1 is formed integrally with a circular flange 7 having a rearwardly directed peripheral skirt 8 and reinforced on its forward face by radially extending ribs 9, which also accommodates the ports 6.

A third port 10 (FIG. 1) constitutes a pneumatic pressure inlet leading to the rear face of flange 7 which constitutes the forward end wall of an annular spring/pneumatic motor chamber 11, the other peripheral wall of which is formed by a tubular casing 12.

The piston 13 of the pneumatic/spring motor is of generally annular form, having sliding engagement at its periphery through a pressure seal 13A with the inside of the casing 12, and at its tubular central part with the exterior of cylinder body 1, through a pressure seal 1A and a wiper seal and/or guide ring 1B. The rear end of the piston 13 has a transverse wall portion 30, or internal flange, which receives an adjustable bolt or set screw 14 abutting the rear end of piston 4.

A large coil compression spring 15 works between the rear face of piston 13 and a rear inner flange 16 of the casing 12, annular slippers 17 of low friction material being interposed to facilitate circumferential and radial movement of the end coils of the spring as it contracts and expands, and to stop the spring from biting into the piston and casing flange 16. Local, peripherally spaced indentations 18 in the casing 12 form stops for limiting rearward travel of the piston 13.

In order to vent the non-working spaces of the unit, a vent hole 19 connects the rear end of the cylinder bore 2 with the interior of the casing 12 which in turn is vented to atmosphere through a filter 20 clamped between a plastic end-cap 21 and a protective sealing boot 22 which is apertured at 23. Preferably, and as shown, the end cap is snap-fitted into the rear end of the casing 12.

The parts of the unit are shown in the position they occupy when pneumatic pressure is relieved from the chamber 11 and the brake friction linings are fully worn. The spring 15 presses the pistons 13, 4 and 3 to their foremost positions, corresponding to a "brakes applied" condition.

In this position the transverse wall portion 30 at the rear end of piston 13 engages the rear end of the cylinder body 1 which provides a stop for the piston 13. The spring force is then taken in the axial length of the body 1 which is, in use, "earthed" to a fixed brake member. If the piston 13 were allowed to bottom in the chamber 11, the spring force would be transmitted to the flange 7 with the result that shearing forces would be set up in the flange where it meets the body 1. To prevent failure, the flange would have to be of substantial thickness to withstand the shearing forces. Thus, by using the rear end of body 1 as a stop the flange may be thinner and thus lighter than would otherwise be necessary.

In normal operation, air pressure is supplied to the chamber 11 to force the piston back to the stops 18, against the action of spring 15. To apply the brakes for service brake operation, hydraulic pressure is passed to the cylinder bore 2, to force the piston 3 forwardly to move the actuator rod, the piston 4 being rearwardly positioned against the bolt 14 to prevent compounding of the hydraulic and parking brake pressures on piston 13.

If the pneumatic system fails, or the driver wishes to park the vehicle, the pneumatic pressure in chamber 11 is relieved, and the spring 15 drives the parts forwardly in the direction of the illustrated positions according to the degree of lining wear.

The bolt 14 may be unscrewed to permit release of the brakes upon failure of the pneumatic system, so that the vehicle can be moved away for repair. In the event of an air failure, the bolt can be removed (when the spring is extended) and the torque on the bolt reduces so that removal becomes progressively easier. As a safeguard against contamination and corrosion, the bore 2 is preferably treated with an anti-corrosive agent.

Figure 3:
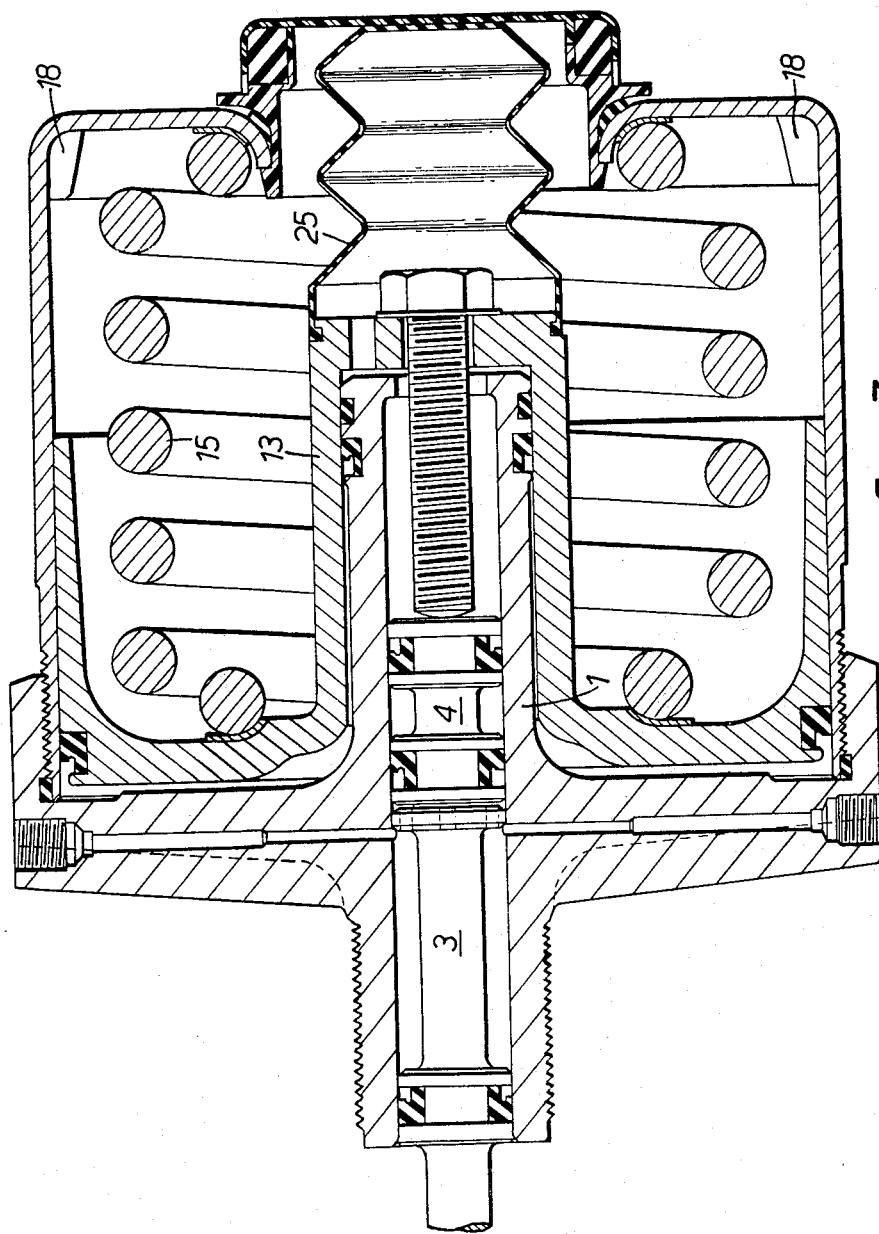
FIG. 3 is a section, corresponding to FIG. 2 of a second form of unit.

FIG. 3 shows a generally similar unit, modified principally in the means for relieving the interior of the cylinder bore of air. A corrugated, flexible sealing boot 25 is fitted over the rear end of the body 1, so that by expansion and contraction of the boot 25, the total volume of air within the cylinder bore and the boot remains constant. Also, the stops 18 are positioned at the rear end of the casing 12 and the peripheral skirt of the piston is extended axially to ensure adequate support of the piston 12.

Figure 4:
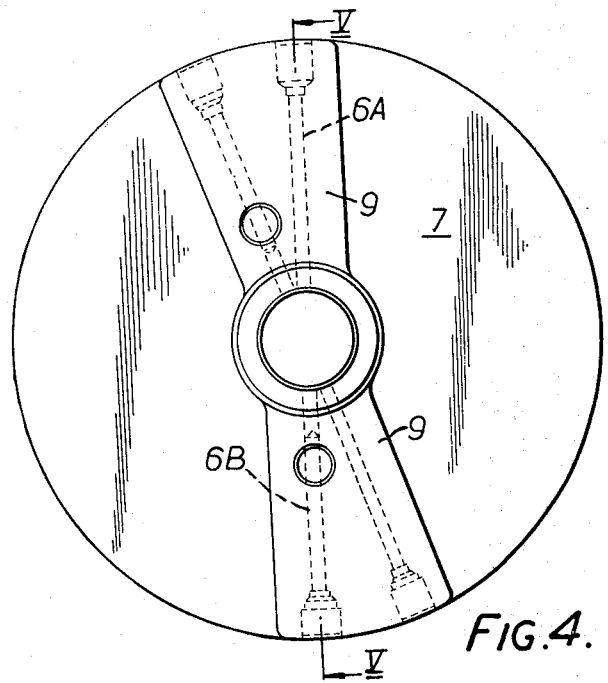

In the unit of FIGS. 4 and 5, provision is made for incorporation of the unit in a dual hydraulic pressure system only one of which can act to provide the anti-compounding pressure. A piston 26 having three piston seals is positioned forwardly of piston 4, and separate supply ports 6A,6B feed the respective cylinder spaces 2A and 2B. The unit is thus hydraulically operable, in known manner using only the same amount of fluid in the non-failed system as before failure, irrespective of failure of either of the pressure systems.

An annular gap between the two intermediate piston seals 28A and 28B registers with a venting port 27 leading, along a downwardly inclined path, to atmosphere at the forward end of piston 3, so that failure of either seal will result in visible seepage of hydraulic fluid. The path is inclined to reduce or eliminate the risk of the seepage of fluid being blocked by the actuating rod of the brake mechanism.

Figure 6:
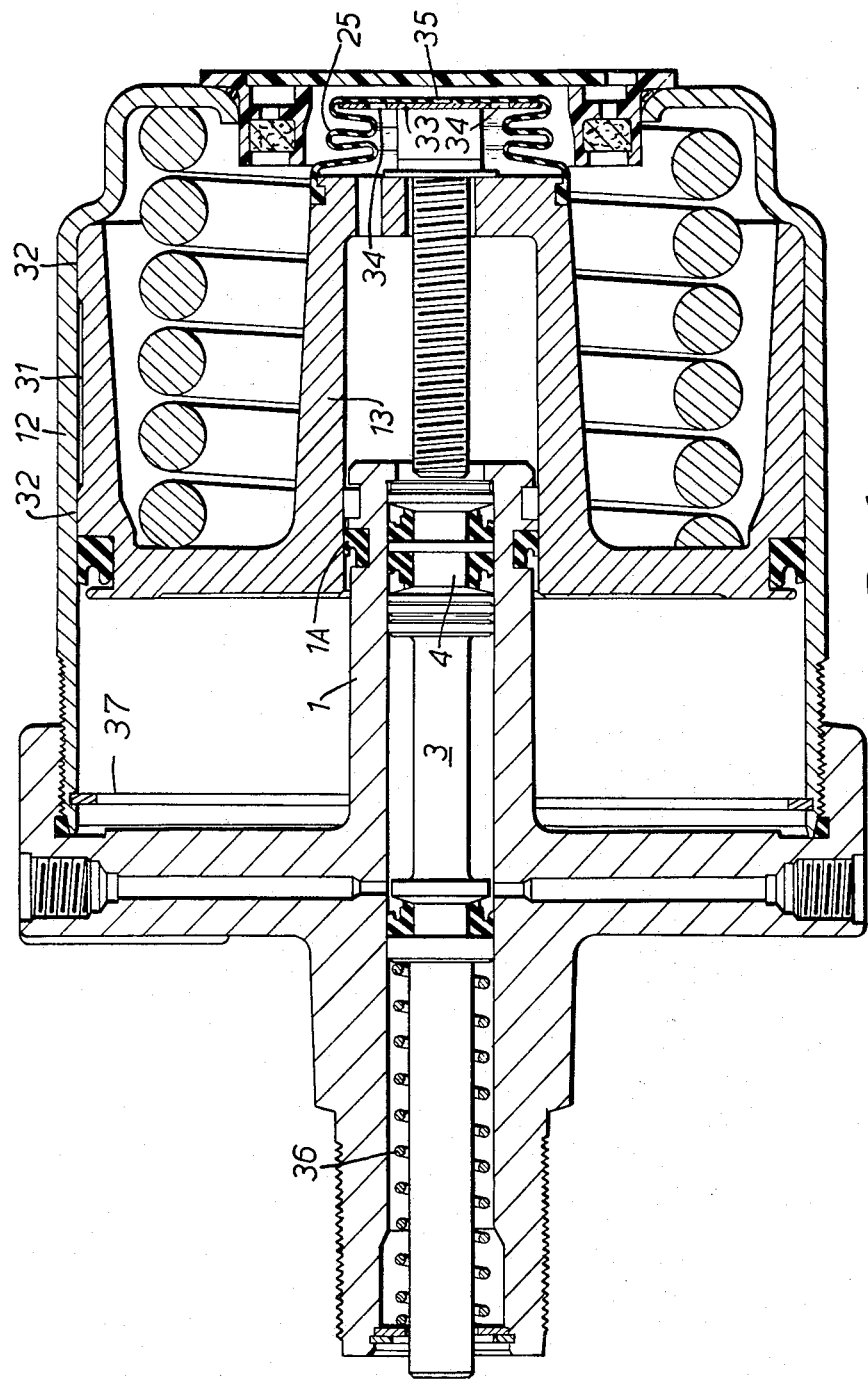
FIG. 6 is a sectional view of another form of unit.

The unit of FIG. 6 is generally similar to that of FIG. 3 and only the principal improvements and modifications are described.

First, a piston return spring 36 is provided to ensure positive return to its rest position of the service braking piston 3. Such return may otherwise be hindered by lost motion, stiffness, seal friction and the like.

Secondly, the outer surface of the skirt of the spring motor piston 13 is recessed at 31 to leave spaced annular bearing lands 32. This modification eases machining and has an additional advantage in that the recess 31 tends to act as a reservoir for lubricating grease which is applied to the interior or casing 12 on initial assembly of the unit.

Finally, the rear end of the spring motor piston is provided with a flexible sealing boot 25 incorporating a non-return valve. This is formed by a valve plate 33 having a circumferentially spaced row of apertures 34 normally sealed by engagement with the transverse end wall of the boot 25. This end wall has a central aperture 35, normally covered by the central portion of the valve plate. In the event of failure of the air-pressure seal 1A, the excess pressure inside the boot is relieved through the valve plate apertures 34 and boot aperture 35. This provides a path of reduced resistance compared with the air/hydraulic seals on piston 4, and thus minimises the risk of contamination of the hydraulic fluid by air, and unintentional application of the brakes by air pressure leaking past the seals on piston 4.

A modification applicable to all the above described embodiments is that a retaining means of any suitable form, such as a circlip 37 shown in FIG. 6 may be fitted in the forward end of the casing 12, after insertion of the piston with the spring compressed, so that subsequently, for initial assembly servicing and repair the casing 12, spring 15 and piston 13 can be handled as a unit without the spring flying out.

A further modification is the provision of a retaining, such as a circlip, which may be fitted at the forward end of bore 2, to prevent the seal 3A coming free of cylinder 1.

We claim:

1. An actuator unit for a vehicle wheel brake comprising a pair of fixed, coaxial, radially spaced inner and outer cylinders surrounding an inner and outer chamber, respectively, the inner cylinder extending into the outer chamber and having an outer cylindrical surface, the outer cylinder having an inner cylindrical surface, inner and outer fluid pressure responsive means in the respective cylinders and moveable between first and second positions, said outer pressure responsive means comprising a piston having inner and outer peripheries respectively sealingly engaging and being slideably guided by the outer cylindrical surface of said inner fixed cylinder and by said inner cylindrical surface of said outer fixed cylinder, spring means biassing said piston towards its second position, means for admitting fluid pressure from a first source to said inner cylinder for controlling the movement of the fluid pressure responsive means therein between its first and second positions, means for admitting fluid pressure from a second source to said outer cylinder to effect movement of said piston to its first position in opposition to the biassing force of said spring means when the pressure is above a predetermined level, and means for transmitting the biassing force of said spring means to the inner pressure responsive means to move it to its second position when the pressure in said outer cylinder is below said predetermined level, said inner fluid pressure responsive means comprising an hydraulically operable piston, and said inner chamber including a working space subject to hydraulic pressure and a non-working space subject to ambient air, a third piston in said inner cylinder separate from said inner piston positioned between said working and non-working spaces, said force transmitting means operating on said third piston to transmit a force to said inner fluid pressure means, a pressure seal and a wiper seal carried by said third piston, said wiper seal being interposed between the non-working space and said pressure seal.

2. An actuator according to claim 1 wherein said third piston between said working and non-working spaces is subject to the hydraulic pressure in said working space for movement in response to said pressure in a direction opposite to said inner piston 3. An actuator according to claim 2 wherein said means for transmitting the biassing force includes an adjustable member carried by said outer piston and extending into said inner cylinder to abut said third piston, the force of said spring means being transmitted to said inner piston through the intermediary of said outer piston, said adjustable member and said third piston when the pressure in said outer cylinder is below said predetermined level, said third piston exerting a force against said adjustable member in an opposite direction to the force exerted by said inner piston in response to hydraulic pressure in said inner cylinder.

* * * * *